Jan. 5, 1965 R. A. PAHL 3,164,282
PACKING MAT
Filed June 8, 1962

INVENTOR.
ROBERT A. PAHL
BY Kimmel & Crowell
ATTORNEYS.

United States Patent Office 3,164,282
Patented Jan. 5, 1965

3,164,282
PACKING MAT
Robert A. Pahl, Roanoke Rapids, N.C., assignor to Wise-Pak Corporation, a division of the American Package Corporation, Murfreesboro, N.C., a corporation of Delaware
Filed June 8, 1962, Ser. No. 201,062
2 Claims. (Cl. 217—26.5)

This invention relates to a packing mat.

Heretofore, packing mats have been known, such as molded pulp trays and others of like nature provided with spaced depressed or raised areas whereby various objects are packed in spaced relation, sometimes in layers, as for example with fruits. In such cases, the cavity or depression is usually of a fixed dimension to correspond exactly or at least approximately to the contours or dimensions of the objects to be packaged. However, it is either expensive to make exact matching cavity mats or impractical to provide more than an approximation. Accordingly, some objects of the present invention are to provide a packing mat which has flexibility over its general area, is provided with spaced cavities or depressions whereby to receive and spacedly retain packaged objects, and is so constructed of such material as to provide not only a cushion for each packed object to protect it entirely from adjacent objects but to also provide for packaging of objects of unlike contours, and furthermore, whereby the packing material pad or cushion, these terms being used herein in a generic sense, permits the objects, when packed in layers, to fully encase themselves in a self-conforming nest.

Further objects of the invention are to provide a packing mat, for fruits, and for other objects, wherein the mat or pad is comprised of at least two sheets of stretchable paper or paperlike moisture absorbent material having interposed therebetween a relatively thick layer of padding, such as for example, shredded paper or other suitable filler material, said pad having therein preformed depressions, dimples, or other spaced cavities, preferably arranged in alternating rows, preferably equispaced from each other, and with both the cavities and the spacings stretchable by impression of the packaged objects therein when packed, so as to substantially entirely snugly encase each object when packed between alternate superposed pads, the moisture absorptive qualities of the stretchable sheets and filler, acting when fruit has been packed, such as apples, and placed in cold storage, to provide moisture to the apples to keep them fresh and when taken out of such storage, to give moisture to the apples to thereby prevent the apples being dry or pulpy.

Yet further, the described mat of this invention, is provided with lengthwise extending reinforcement at each of its sides or at any two oppositely disposed sides thereof to provide sufficient rigidity for lifting the mat traylike, with its contents, from a loaded container, whereby the contained objects in each mat can be handled or carried as a unit.

A further and more specific object of the invention is the provision of a packing mat of this character which is comprised of spaced layers of crepe or stretch paper having a filling of shredded paper or similar material therebetween whereby the contour of the individual oppositely disposed dimples or recesses will yield to conform to the particular size and shape of the piece of fruit protected thereby.

An additional and more specific object of the invention is the provision of such a tray or mat provided along each edge with a stiffening or reinforcing strip so that the tray or mat and its contents may be lifted from or placed within a crate as a unit.

A further object of the invention is the provision of a mat of this character which may be reutilized, if desired, for the packaging of additional fruit.

A more specific object of the invention is the provision of a packing mat specifically adapted for employment with high quality and grade apples, which will so protect the fruit as to prevent any bruising or damaging of each individual apple, and preclude any consequent requirement for price reduction when the apples reach the retailer.

Still other objects reside in the combinations of elements, arrangements of parts, and features of construction, all as will be more fully pointed out hereinafter and disclosed in the accompanying drawings wherein.

Similar reference characters refer to similar parts throughout the several views of the drawing.

Figure 1:
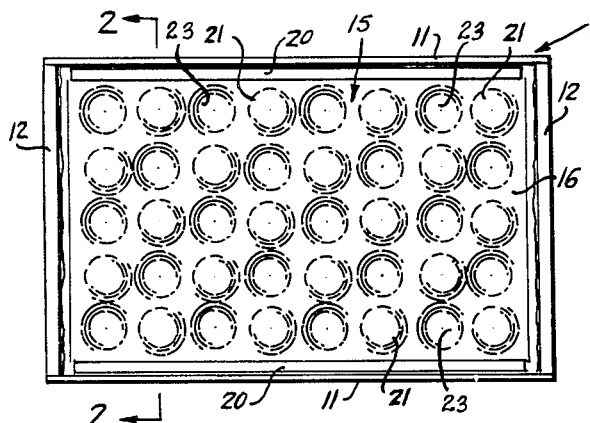
FIGURE 1 is a top plan view of a fruit crate containing apples or the like packed between a series of mats, the collar of the crate being removed to show the top mat.
Figure 3:
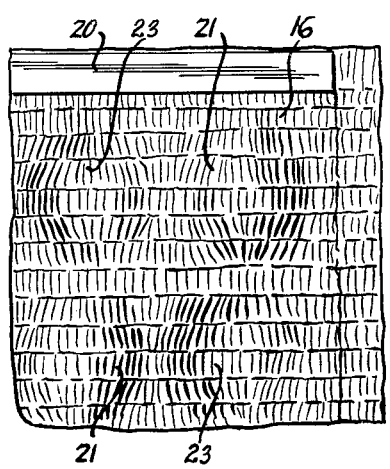
FIGURE 3 is an enlarged fragmentary sectional plan view of a corner of the mat showing constructional details.
Figure 2:
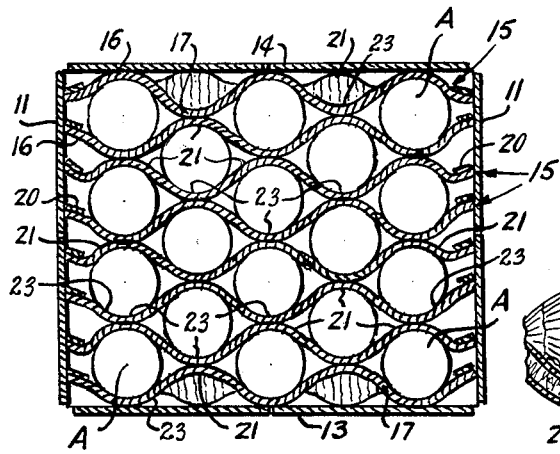
FIGURE 2 is a vertical sectional view taken substantially along the line 2—2 of the FIGURE 1 as viewed in the direction indicated by the arrows.
Figure 5:
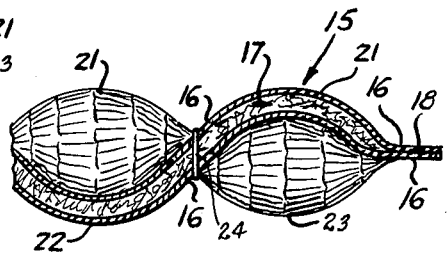
FIGURE 5 is a fragmentary vertical view similar to FIGURE 4 but taken longitudinally of the mat and showing an end thereof.

Having reference now to the drawings in detail, there is generally indicated at 10 a fruit crate of any desired conventional type, which includes side walls 11, end walls 12, and a bottom 13. As shown in FIGURE 2, a top 14 is applied to the crate after it is packed.

The crate is adapted to contain when filled a plurality of apples A, or other spherical or substantially spherical fruits packed between a plurality of mats generally indicated at 15, which mats comprise the subject matter of the instant invention.

Each mat 15 is comprised of two layers 16 of suitable material such as stretch or crepe paper which may be inexpensively manufactured, and which will yield to conform to the individual fruit covered or packaged thereby. The layers 16 are spaced apart and the space therebetween is filled with any suitable material such as shredded paper 17, shredded paper being particularly applicable because of the inexpensive nature thereof. Along its end edges the two opposed layers of each mat are adhesively sealed with any suitable adhesive 18, while the side edges of the sheets indicated at 19 are similarly sealed with adhesive 18. In the illustrative embodiment of the invention shown the side edges of each mat are provided with a longitudinally extending reinforcing strip 20 which may be comprised of cardboard, of thin fiberboard, or any other suitable inexpensive material, for the purpose of stiffening the article along at least two opposite edges to permit the mat and any fruit carried thereby to be picked up as a unit without collapse of the mat.

It must be understood that the pad of this invention, being made of the described stretchable material, can also be used without preformed dimples or cavities and that when the fruit or other article is placed on the pad, it will form its own nest by its own weight. By suitably staggering or arranging the subsequently placed articles on the subsequent layers, they will form their own non-conflicting nests. The invention therefore contemplates also this broad concept.

Figures 6, 7:
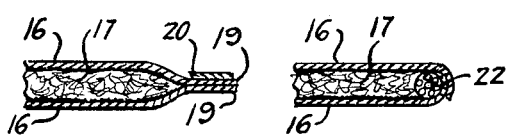
FIGURE 6 is a fragmentary vertical view.
FIGURE 7 is a fragmentary detail vertical view showing a modified form of edge reinforcement.

FIGURE 6 is a fragmentary detail in cross-section of any edge of the mat showing a form of reinforcement or stiffener strip 20. However, another and more preferable form of edge reinforcement and stiffener is shown by the cross-sectional detail view of FIGURE 7 wherein the ends of the layers 16 are brought around over the sides of a rope-like material 22 impregnated with a self-hardening or heat hardening resin and secured to each other and to the material 22. It will also be noted that the inner face of one or both of the sheets or layers 16 is coated with a similar resinous material to hold the filler 17 in place against undue shifting or bunching while at the same time allowing for the desired stretch action in the portions of the pad in which the packed objects are placed.

In one embodiment of the present invention suitable means are provided for connecting together the two layers 16 at spaced points thereof. These means are diagrammatically indicated at 24. The exact type of connection is immaterial, and such prior art means as staples 15 and 22 of U.S. Patent No. 1,902,361 issued Mar. 21, 1933, to Hamersley can be used.

The invention has been described with special reference to fruit packing, especially, apples, but is also suitable for other objects not only of like contours with respect to each other but also of irregular contours, for example, pears, and even non-edibles. The layers 16 and the filler are moisture absorbent and may be of other than paper, crepe-paper, or shredded paper, so long as they are stretchable and when stretched to its contours by the packaged object will stay in that shape.

Figure 4:
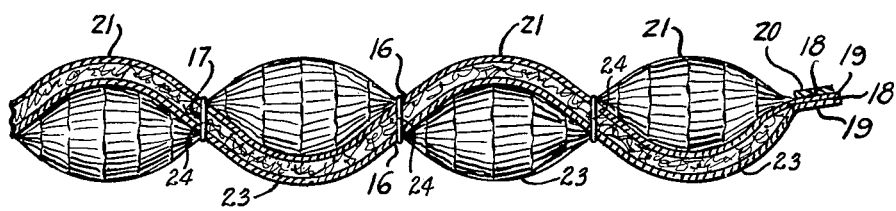
FIGURE 4 is an enlarged vertical sectional view taken transversely of the mat showing the side reinforcement thereof.

If desired, similar reinforcing strips (not shown) may be provided along the end edges, so that all four edges of the tray are suitably stiffened. In the formation of the tray, concave depressions are formed in alternate rows longitudinally and transversely the full extent of the mat. The convex depressions or dimples extending in opposite directions as indicated at 21 and 23, are formed by the pressure of the underneath layer of packaged fruit so that one presents a concaved downwardly extending surface in which an apple or other object seats, while the adjacent convex cups both longitudinally and transversely present an upwardly curved surface which covers the tops of the next lower layer. The arrangement is thus such that each individual apple is fully protected from engagement with an adjacent laterally positioned or upper or lower fruit to completely protect the fruit from rubbing against or impacting an adjacent fruit to bruise or damage the same, thus preserving the appearance, as well as the quality of the fruit, and preventing spoilage. By the employment of a plurality of the mats alternately disposed as disclosed in FIGURE 2, it will be seen that a series of layers or trays of fruit are provided, with the individual fruit in each layer fully protected, and the arrangement being such that a layer or tray or mat of fruit may be individually lifted from the crate, when desired, for display purposes or the like, or alternately, each individual apple or other fruit may be removed from its tray as desired and, inasmuch as the two layers 16 of each mat are connected together through the mat at spaced points between dimples (as diagrammatically indicated at 24), each dimple 21 or 23 tends to be an entity in and of itself. As a result each dimple 21 or 23 is individually yieldable to accommodate various sizes and shapes of the product to be packed, without interfering unduly with an adjacent unit of product. The porosity or moisture absorbent quality of the mat takes in moisture during cold storage to keep the apples fresh and when removed from storage the same moisture in the mat is absorbed by the fruit so it is not pulpy or dry. As seen in FIGURE 4, the mat is shown in the stretched condition which would result from the described packing of the fruit or other objects.

From the foregoing it will now be seen that there is herein provided an improved packing mat particularly adapted for the packaging of high quality apples or similar fruit, which accomplishes all the objects of this invention, and others, including many advantages of great practical utility and commercial importance.

As many embodiments may be made of this inventive concept, and as many modifications may be made in the embodiment hereinbefore shown and described, it is to be understood that all matter herein is to be interpreted merely as illustrative, and not in a limiting sense.

I claim:

1. A packing mat comprised of spaced cover layers of yieldable material secured along their opposite edges, and packing between said layers, said mat being provided with alternate convex and concave dimples in longitudinally and transversely extending rows, said yieldable material comprising stretch paper and said packing comprising shredded paper, stiffening members comprising a rope-like structure impregnated with resin-hardened material positioned and extending along at least two opposite parallel edges of said mat, the adjacent edges of each cover layer being brought around over the side of said rope-like structure and secured to each other and to said rope-like structure, and means connecting said cover layers together at spaced points of their surfaces.

2. A packing mat comprised of spaced cover layers of moisture absorbent stretch paper secured along their opposite edges, and a thick layer of padding therebetween, said mat being provided with alternate convex and concave dimples in longitudinally and transversely extending rows, the inner face of at least one said cover layer being coated to its extreme edges with a hardenable resinous material, at least two opposed edges of the mat each comprising a rope-like structure impregnated with resin-hardened material, the adjacent edges of each cover layer being brought around over the side of said rope-like structure and secured to each other and to said rope-like structure at least in part by said inner coating of hardenable resinous material, and means connecting said cover layers together at spaced points of their surfaces.

References Cited by the Examiner

UNITED STATES PATENTS

| 847,854 | 3/07 | Voorhorst | 217—26.5 |
| 1,632,722 | 6/27 | Woodall | 217—3 |
| 1,750,545 | 3/30 | Stabernack et al. | 229—3.1 |
| 1,850,895 | 3/32 | Robinson | 154—54.1 |
| 1,902,361 | 3/33 | Hamersley. | |
| 2,194,963 | 3/40 | White | 217—3 |
| 2,625,695 | 1/53 | Nicholson | 154—46 |
| 2,657,158 | 10/53 | Gerard | 217—3 |
| 2,841,421 | 7/58 | Heere | 220—46 |

FOREIGN PATENTS

| 1,193 | 1910 | Great Britain. |

THERON E. CONDON, *Primary Examiner.*

EARLE J. DRUMMOND, *Examiner.*